United States Patent [19]

Ritzerfeld et al.

[11] Patent Number: 4,585,352
[45] Date of Patent: Apr. 29, 1986

[54] SYSTEM FOR MEASURING THE OPTICAL DENSITY OF BOTH THE BACKGROUND AND THE IMAGE AREAS OF AN ORIGINAL

[75] Inventors: Willem G. J. Ritzerfeld, Venlo; Bastiaan B. B. Eertink, Grubbenvorst, both of Netherlands

[73] Assignee: Océ-Nederland B.V., Venlo, Netherlands

[21] Appl. No.: 546,372

[22] Filed: Oct. 28, 1983

[30] Foreign Application Priority Data

Nov. 3, 1982 [NL] Netherlands .......................... 8204260

[51] Int. Cl.$^4$ ............................................ G01N 21/59
[52] U.S. Cl. ..................................... 356/444; 250/559; 356/433
[58] Field of Search ........ 356/443, 444, 448, 429–435; 355/68, 41; 250/559, 571

[56] References Cited

U.S. PATENT DOCUMENTS

| | | |
|---|---|---|
| 3,202,042 | 8/1965 | Jamieson et al. .................... 356/444 |
| 3,717,077 | 2/1973 | Harvey ................................. 354/432 |
| 4,001,594 | 1/1977 | Akimoto et al. ................. 356/443 X |
| 4,150,894 | 4/1979 | Meyer et al. ..................... 356/443 X |
| 4,239,384 | 12/1980 | Treiber ........................... 356/444 X |
| 4,251,157 | 2/1981 | Knor et al. ...................... 356/444 X |
| 4,302,780 | 11/1981 | Yamazaki et al. .................... 358/228 |
| 4,379,632 | 4/1983 | Dedden et al. .................. 356/444 X |
| 4,464,036 | 8/1984 | Taniguchi et al. .............. 356/443 X |

*Primary Examiner*—Vincent P. McGraw
*Assistant Examiner*—Robert D. V. Thompson, III
*Attorney, Agent, or Firm*—Albert C. Johnston; Louis H. Reens

[57] ABSTRACT

The optical densities of both the background and the image areas of an original are measured so as to obtain a control signal useful in photocopying the original, by a system which includes a detector for generating a measuring signal representing optical densities detected on the original; a detector for deriving from the measuring signal a peak signal level representing the background density; first and second detection circuits for producing respective output signals representing numbers of measuring signal portions detected at first and second reference signal levels, which levels differ from each other and each from the peak signal level; a control rendering the reference signal levels dependent in magnitude on the derived peak or background signal level, and preferably proportional to it; and a comparison circuit for deriving from the output signals a control signal indicating in relation to the background density the relative amounts on the original of image information items that have optical densities detectable at the reference signal levels. In this way, for instance, weak image information differing little in optical density from the background is measurable on an original in relation to both the background and relatively strong image information so that a control signal to aid copying of all the information can be generated.

7 Claims, 5 Drawing Figures

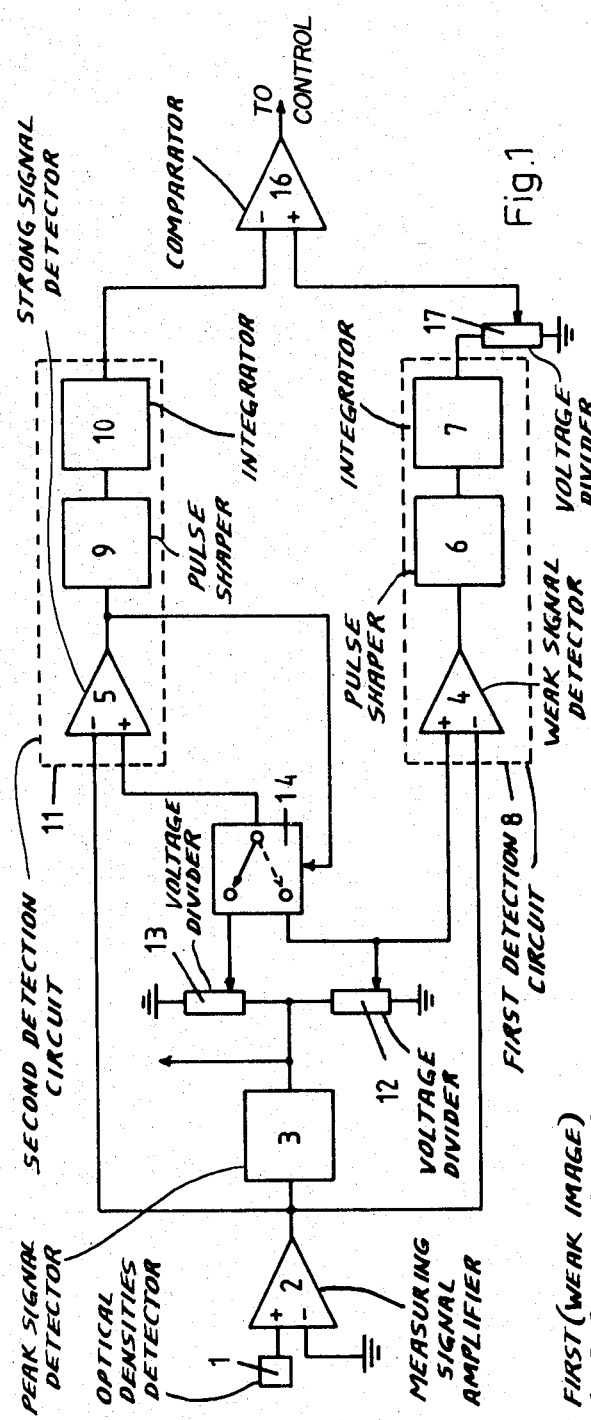

SYSTEM FOR MEASURING THE OPTICAL DENSITY OF BOTH THE BACKGROUND AND THE IMAGE AREAS OF AN ORIGINAL

This invention relates to a system for measuring the optical density of both the background and the image areas of an original such, for instance, as a document to be copied in a photocopying machine.

A system of this kind is disclosed in U.S. Pat. No. 3,202,042. According to that disclosure a circular strip of an original is scanned by a detector which generates a measuring signal in the form of a wave containing various peaks depending upon the optical densities sensed in the strip by the detector. A peak detector selects the highest potential of the measuring signal pattern as a measure of the optical density of the background of the original. A detection circuit comprising a signal level detector and a counter is used to determine the number of signal portions occurring in the pattern above a first reference level which is manually adjustable but remains constant during the measurement. A second detection circuit is used in the same way to determine the number of signal portions above a second reference level which is higher in magnitude than the first and also is held constant during the measurement. The relationship between the two numbers of signal portions is determined in a comparison circuit and displayed by means of an indicator. By varying the intensity of the light source for illuminating the original one can determine how many of the signal portions can be brought to an optical density above one and the same reference level while still keeping the optical density of the background within accepted limits. If at a light intensity set for the measurements there is a sufficiently large difference between the optical density of the image areas and that of the background, the original is copied with the light source set to that intensity. The measuring system is intended for measuring originals that are to be copied on contrasty light-sensitive material, such as lithographic film, upon which it is desired to reproduce all the image information having an optical density within specific limits on a background whose optical density differs considerably from that of the image information.

That known measuring system is unsuitable for use in copying machines having an automatic exposure control designed to produce copies on which not only relatively strong but also weak information of the original is to be reproduced. The term "weak information" as used here denotes information whose optical density differs only little from that of the background of the original. Generally, such weak information is completely or partially lost in copying if the copying conditions are selected so as to produce a white background on the copy. When the original contains weak information it is, therefore, a frequent practice to use different process conditions, e.g. a different exposure or, in the electrophotographic process, a different developing voltage on the developing electrode. The result is a copy having a shaded background upon which weak information is reproduced still weak but without any information loss.

The said known system also requires the use of the same light source for exposing the original during both the measuring and the copying of the original. This is a drawback for use of the system in modern copying machines in which the exposing illumination is usually effected by flashed light.

The principal object of this invention is to provide an improved system for measuring the optical density of both the background and the image areas of an original, by which the above-mentioned disadvantages of said known system are obviated. Thus, optical density measurements are obtained which enable both strong and weak image information on an original to be copied satisfactorily. Moreover, the improved system is not limited to use of the light source that will be employed for exposing the original when it is copied.

The measuring system of this invention is similar to the above mentioned known system in that it makes use of means such as a photoelectric detector for detecting the optical densities present on a strip of the original and generating a measuring signal representative of such densities, together with means for deriving from the measuring signal a peak signal level representing the optical density of the background of the original, a first detection circuit for detecting first portions of the measuring signal that deviate from the peak signal level more than does a first reference signal level and producing a first output signal indicative of the number of detected first signal portions, a second detection circuit for detecting second portions of the measuring signal that deviate from the peak signal level more than does a second reference signal level and producing a second output signal indicative of the number of detected second signal portions, and a circuit means for comparing the first and second output signals to derive a control signal indicative of optical densities.

According to the present invention, the measuring system is improved so as to enable achievement of the stated objects, by providing it with control means rendering the magnitudes of the first and second reference signal levels a function of the peak signal level, so that the derived control signal will indicate in relation to the optical density of the background of an original relative amounts of image information items on the original that have optical densities detectable at the reference signal levels. The control signal thus is useful, for instance, when the first and second reference signal levels are adapted for detection of the respective optical densities of weak image information and strong image information on an original, for making copies of the original that reliably reproduce both the weak and the strong image information. Preferably, the control means for the reference signal levels function to hold them at magnitude proportional to the magnitude of the derived peak signal level.

Other objects, features and advantages of the invention will be evident from the following description and the accompany drawing of an illustrative embodiment of the invention. In the drawing:

FIG. 1 is a schematic diagram of a circuit for a measuring system according to the invention;

FIGS. 2–5 are graphs of signals generated at several different locations in the circuit of FIG. 1.

The circuit shown in FIG. 1 comprises a detector 1 which can be mounted at a suitable location in a photocopying machine and used to measure the optical densities present on a strip of an original being moved past the detector. The detector is connected to the input of an analog amplifier 2. The output of the analog amplifier is connected to a peak signal detector 3, to the inverting input of a first signal level detector 4, and to the inverting input of a second signal level detector 5.

The level detector 4 produces an output that is passed to a monostable multivibrator 6 and an integrator 7 successively. These elements together with detector 4 form a first detection circuit 8. The output of level detector 5 passes to a monostable multivibrator 9 and an integrator 10 successively, so that these elements together with detector 5 form a second detection circuit 11.

The output of the peak signal detector 3 is passed to two adjustable voltage dividers 12 and 13, each of which has an adjustable tap (indicated by an arrow) to enable selection of the ratio of its output potential to the peak signal potential (represented by arrow 3A) determined by detector 3.

The adjustable tap of the voltage divider 12 is connected to the non-inverting (+) input of the level detector 4. The non-inverting input (+) of level detector 5 is connected to an output contact of a switch element 14 which is connectable selectively through two input contacts to the adjustable tap of either voltage divider 12 or voltage divider 13. Thus, depending on the position of the switch element 14, the level detector 5 is connected either to the voltage divider 12 or to the voltage divider 13. The control input for switching the switch element 14 is connected to the output of the level detector 5. The output of integrator 10 is directly connected to the inverting input of a comparator 16, and the output of the integrator 7 is connected via an adjustable voltage divider 17 to the non-inverting input (+) of the comparator 16.

During the scanning of a positive original, the detector 1 generates a measuring signal which is converted by amplifier 2 into an amplified signal having with respect to the ground potential 22 a shape, for instance, like that of the curve 21 shown in FIG. 2. The deep dips in the curve represent image information of high optical density (strong information), and the shallow dips represent image information of low optical density (weak information) on the original. The peak detector 3 selects from the measuring signal pattern a peak signal value, or extreme potential, 23 which is a measure of the optical density of the background of the original.

A first reference potential 24 proportional to the peak potential 23 is applied via the voltage divider 12 to the non-inverting input of the level detector 4. A second reference potential 25 proportional to the peak potential 23 is applied via the voltage divider 13 to the non-inverting input of the level detector 5. At the same time, the amplified measuring signal represented by curve 21 is fed directly to the inverting inputs of the two signal level detectors 4 and 5. Each of these detectors generates a high signal at its output at the moments when the amplified measuring signal is lower than the associated reference potential, and generates a low signal when the amplified measuring signal is higher than the associated reference potential. Each level detector thus detects those portions of the measuring signal which are displaced farther away from the peak potential than is the particular reference potential associated with the level detector.

Since the respective reference potentials remain dependent on the peak potential 23, the first reference potential 24 can in fact be set to a value close the peak potential representing the background, so that weak information can be detected irrespective of the optical density of the background of the original.

The signal generated at the output of the level detector 4, as by the high signal portions of curve 21 at the first reference level 24, has a block pulse shape as shown at 26 in FIG. 3. The signal generated at the output of the level detector 5, as by the high signal portions of curve 21 at the second reference level 25, has a block pulse shape as shown at 27 in FIG. 3. The block shaped signal 26 is representative of all the image information detected by the detector 1, and the block shape signal 27 is representative of strong image information detected by the detector 1.

Small variations occurring in the signal pattern relative to the second reference potential 25, as represented at A in FIG. 2, are prevented from appearing separately at the output of the level detector 5, because when a high signal is generated at the output of level detector 5, the switching element 14 is switched over, as indicated by the broken line arrow in FIG. 1, so as to connect the first reference potential 24 at the output of voltage divider 12 to the level detector 5. Switching element 14 then will be returned to its initial state only when the amplified measuring signal again becomes higher than the first reference potential 24. The switching element 14 thus offers the advantage that, when an original carries image information having a high optical density, minor variations which might yield a measuring signal having a plurality of peaks, such for example as those shown at A in FIG. 2, are detected and processed as a single area or item of strong image information and not as several items thereof.

Each rising flank of the signal block in the pattern 26 or 27, respectively, is converted by the monostable multivibrator 6 or 9 into a pulse of fixed width and amplitude as indicated in FIG. 4. The pulses so formed are integrated by the integrator 7 or 10, respectively, to give a d.c. signal 28 or 29, respectively, as indicated in FIG. 5, whose potential with respect to ground is proportional to the number of pulses generated during the measuring interval at the output of the monostable multivibrator 6 or 9, respectively. The two d.c. signals are fed to the comparator 16. When the adjustable voltage divider 17 is set to a maximum output value, the output of the comparator 16 will indicate whether the number of signal portions representative of areas of strong image information on the original is equal to or less than the total number of signal portions representative of all image information on the original. If then the comparator output indicates a lesser number of strong information items, the circuit can have determined and signaled that a single item of weak image information is present on the test strip portion of the original. Further, simply by changing the setting of the voltage divider 17 the circuit can be made to react to a different ratio between the number of items of strong image information and the total number of items of image information and, thus, to any of various ratios of weak image information to strong image information.

The signal generated at the output of peak detector 3 can be used to control an automatic exposure regulation system in a copying machine so that the machine preferably yields copies with a white background when the copy paper is white. If the signal at the output of comparator 16 indicates that more than a certain limited percentage of weak image information is present in the scanned part of the original, that signal can be used to provide a fixed correction to the automatic exposure regulation system. Alternatively, in the case of an electrophotographic copying machine, the counter-voltage on the developing device in the machine, or that counter-voltage and the exposure together, can in many cases be altered to give copies having a shaded background on which the items of weak information remain visible.

It will be obvious that the invention is not limited to the embodiment here illustrated and described. The invention can be carried out in various other ways and embodiments. For example, the detector 1 may be a photoelectric cell that is moved over a stationary original; also, the detector may scan either a strip of the original or the entire original. In other embodiments the detector 1 may be an array of photocells which detects the image information on a strip of the original at one moment and transmits the detected information per photocell successively to the circuit coupled thereto. Further, a circuit arrangement different from the one shown can be used. For example, instead of employing a switching element 14 as shown in FIG. 1, a JK flip-flop can be provided between the level detector 5 and the monostable multivibrator 9 and connected via the J or K input with the level detector 4 so as to be blocked to the rising or falling flanks of signal pulses such as those shown at 26 in FIG. 3 by means of the signal at the output of detector 4.

Still other embodiments of the invention may make use of a microcomputer as a switching device, as the microcomputer can ensure that the detection circuit 11 will not detect more than one occurrence of strong image information as long as a high signal exists at the output of the level detector 4.

The integrators 7 and 10 in the embodiment of FIG. 1 can also be replaced, as by employing counters with their respective outputs passed to a comparator circuit adapted to compare the counted signal portions.

The invention of course can also be carried out in embodiments adapted for effecting measurements of the optical densities on negative originals. This may be accomplished, for instance, with an embodiment like that of FIG. 1 in which the peak detector 3 is adapted to measure minimum optical densities instead of maxima, with the voltage dividers 12 and 13 replaced by summing devices and the inputs of the level detectors interchanged.

For measurements of the optical densities present on transparent negative originals, it may be advantageous to adapt only the peak detector and the inputs of the level detectors. Thus, the voltage dividers 12 and 13 would not be replaced by summing devices and, instead of being connected to ground, would be connected to a base potential derived from a blank measurement by the detector 1. Such a blank measurement can be effected in the case of each such original, for instance, by exposure of the detector to light of the light source itself, i.e. without a negative being present between the detector and the light source, and retaining the blank measurement during an ensuing measurement on the original.

The use of a base potential derived in this way enables the circuit to be automatically corrected within certain limits for variations in detector sensitivity and for variations in light intensity that result from aging of the light source used in the measurements.

The invention is not limited to embodiments in which two level detection circuits are used. More than two such circuits may be provided, thus providing a measuring system that can be used to measure, in addition to weak and strong information, also image information of moderate strength so that the derived output signal will enable a copy to be produced having an unshaded, slightly shaded or more intensely shaded background, depending upon the quantities of the various kinds of information occurring on the original.

What is claimed is:

1. In a system for measuring the optical density of both the background and the image areas of an original, including means for detecting optical densities present on the original and generating a measuring signal representative of said densities, means for deriving from said measuring signal a peak signal level representing the optical density of the background of the original, first detection means for detecting first portions of the measuring signal that deviate more from said peak signal level than does a first reference signal level and producing a first output signal indicative of the number of detected first signal portions, second detection means for detecting second portions of the measuring signal that deviate more from said peak signal level than does a second reference signal level and producing a second output signal indicative of the number of detected second signal portions, and means for comparing said first and second output signals to derive a control signal,
   the improvement wherein said system comprises control means rendering the magnitudes of said first and second reference signal levels each a function only of the magnitude of said peak signal level and causing the derived control signal to indicate in relation to said background density the relative amount of weak image information items to detected image information items on the original.

2. A measuring system according to claim 1, said control means being operative to render said first and second reference signal levels each proportional to the potential of said peak signal level.

3. A measuring system according to claim 1, said control means being operable to hold said first and second reference signal levels to potentials differing from each other and each differing by a predetermined constant amount from the potential of said peak signal level.

4. A measuring system according to claim 1, 2 or 3, and wherein said second reference signal level differs from said peak signal level more than does said first reference signal level, said system including means rendered operative upon detection of a said second signal portion by said second detection means to prevent such detection of another second signal portion until after the next change of said first output signal.

5. A measuring system according to claim 1, 2 or 3, further including means for effectively disabling said second detection means upon its detection of a said second signal portion and means for re-enabling said second detection means thereafter upon the next change of the output signal of said first detection means.

6. A measuring system according to claim 1, 2 or 3, said control means comprising first and second adjustable voltage dividers each connected to be driven by an output of said peak level deriving means, the output of said first voltage divider being connected with an input of said first detection means, and means for connecting the output of said second voltage divider to an input of said second detection means.

7. A measuring system according to claim 6, said connecting means comprising means responsive to a said second signal portion detected by said second detection means for switching a connection of said input of said second detection means from said second divider output to said first divider output and means operative in response to a said first signal portion after such switching to restore such connection with said second divider output.

* * * * *